United States Patent [19]
Ross

[11] 3,802,673
[45] Apr. 9, 1974

[54] STABILIZED FLOATING AERATION SYSTEM

[75] Inventor: George Ross, Downers Grove, Ill.
[73] Assignee: Clow Corporation, Oak Brook, Ill.
[22] Filed: Nov. 3, 1972
[21] Appl. No.: 303,527

[52] U.S. Cl.................. 261/91, 9/8 R, 210/242
[51] Int. Cl............................................. B01f 3/04
[58] Field of Search ............... 261/91, 92; 210/242; 9/8 R

[56] References Cited
UNITED STATES PATENTS
3,462,132  8/1969  Kaelin.................................. 261/91
3,620,512  11/1971  Muskat et al........................ 261/91
3,680,847  8/1972  Grutsch et al....................... 261/91

Primary Examiner—Frank W. Lutter
Assistant Examiner—Steven H. Markowitz
Attorney, Agent, or Firm—Fitch, Even, Tabin & Luedeka

[57] ABSTRACT

A stabilization system for a floating water aerator utilizing a surrounding open platform spaced apart a significant distance from the floating aerator and connected to the aerator by a plurality of mooring and guy lines. The floating platform provides a rigid polygonal frame having excess buoyancy and is anchored to the bottom of the body of water by lines depending from the corners of the polygon.

9 Claims, 3 Drawing Figures

STABILIZED FLOATING AERATION SYSTEM

This invention relates to floating aeration systems, and more particularly to systems for stabilizing floating water aerators.

Water aerators aid in purifying water by mixing air with the water to dissolve oxygen thereinto. Many of these aerators have motor driven, rotatable impellers and are capable of being floated in a body of water. The impellers violently throw the water into the air in the form of droplets thereby creating a large amount of surface area for oxygen diffusion and exposing the bacteria within the water to the oxygen within the air. This process causes oxygen enrichment of the water and allows the bacteria within the water to be more efficiently utilized to purify the water.

Floating aerators are commonly moored to maintain them at the desired location where the aerator is to operate. Usually, mooring lines extend from the float of the aerator to a shore anchor. These mooring lines may also aid in keeping the aerator rotatably stable. If the aerator were not attached or moored in some fashion, the torque created by an impeller rotating about a vertical axis in the water might cause the aerator itself to spin in the water.

Aerators which have their drive units mounted above the water are most frequent top-heavy as a result of having their center of gravity located above the water line. The dynamic forces created by a rotating impeller accentuate this instability, and such aerators might possess erratic movement patterns which could interfere with the effective operation of the aerator. Oftentimes the erratic motions of the aerator, perhaps coupled with a wind condition, are sufficient to cause an aerator to capsize. This is especially true in winter when water spray collects as ice on the upper portion of the aerator causing the aerator to be even more top-heavy and unstable.

Uncontrolled movements of the floating aerator are especially accentuated when the aerator is operating in a large body of water and the mooring lines, which stretch from the aerator to the shore, are of an extended length. If the aerator is anchored rather than moored, the anchor line serves primarily to insure the aerator does not drift away from a given location; the anchor line does not provide sufficient stabilization capabilities to restrain the aforedescribed erratic movements of an aerator. Additionally, extremely long mooring lines are difficult to utilize and are themselves quite expensive.

Because such uncontrolled erratic movements of the aerator can result in damage to the equipment as well as severely detracting from the efficiency of the aerator, it is advantageous to stabilize the aerator.

It is the object of this invention to provide a stabilization system for a floating aerator.

It is another object of the present invention to provide a floating platform for attachment to a floating aerator in a manner which will result in the aerator being stabilized.

It is still another object of the present invention to provide a system of stabilization for a floating aerator which allows greater freedom of design with respect to the aerator drive mechanism and/or its float.

It is a further object of the present invention to provide a stabilization system for a floating aerator being operated in a relatively large body of water which does not require extended mooring lines.

These and other objects and advantages of the invention will become apparent upon reading the following description in conjunction with the accompanying drawings of which:

Figure 1:
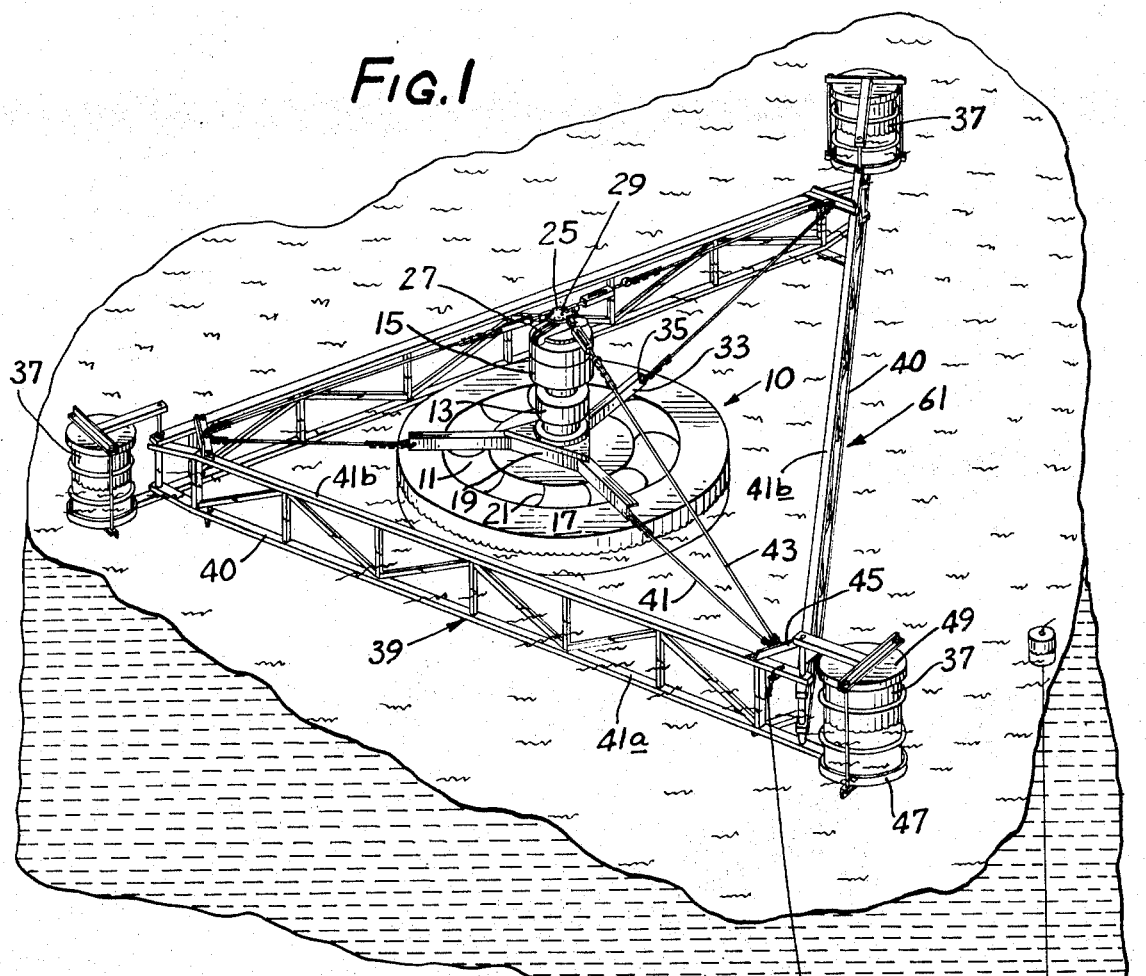
FIG. 1 is a perspective view of a floating aerator operating in a large body of water and being stabilized by a system having features of the present invention.

Briefly, the illustrated floating aerator 10 comprises an impeller 11 connected by suitable drive means 13 to a motor 15. A float or flotation collar 17 peripherally surrounds the impeller 11 and its drive means in an outboard alignment and is connected thereto by a supporting frame 19.

The impeller 11 is located at least partially below the water line and includes a plurality of blades 21 mounted for horizontal rotation about a vertical shaft or axis. The motor 15 is located above the water line and is usually an electric motor which is connected to a shore power source by a water proof electric cord (not shown). Mounted on the uppermost portion of the motor is a guy mount 25. The guy mount 25 includes a supporting bracket 27 which is secured on top of the motor and a mounting plate 29 which is attached to the uppermost portion of the bracket 27. The mounting plate 29 is a flat rigid plate, circular in plan, having a plurality of clevis mounting holes uniformly spaced about its circumference.

The frame 19 of the aerator includes three radially extending arms 33 spaced a uniform angular distance apart and having mooring line mounting holes 35 at their free ends. The flotation collar 17 is fixed in position below the arms 33 and extends peripherally of the impeller. The flotation collar 17 provides sufficient buoyancy to support the aerator impeller 11 in the desired vertical relationship to the water line.

In the past, certain aerators have depended upon excess buoyancy of the flotation collar 17 to keep the aerator upright and have employed dynamically balanced components, that is, symmetrical motors, gearing mechanisms and the like, to minimize the instability of that portion of the aerator above the water line. In accordance with the stabilization system illustrated herein and hereinafter described, neither balanced components nor excessively buoyant flotation collars are necessary, and stabilization is accomplished without the use of excessively long mooring lines.

The illustrated stabilization system includes a platform which is made up of three floats 37 and a rigid frame 39, plus three mooring lines 41 and three guy lines 43.

The frame 39 is polygonal in shape, being illustrated as an equilateral triangle, the preferred embodiment. Each leg 40 of the triangle is a straight truss 40 feet in length, and each is formed of two spaced apart, generally, horizontal beams 41a and 41b which are interconnected by spacers 42 and stiffeners 43. The ends of adjacent trusses 40 are adapted to form the mating elements of a hinge, with the trusses being interconnected in pairs by a slidable hinge pin 44. Additionally, the trusses 40 are fixed together adjacent the corners of the triangle by cross-ties 45 which are bolted to respective pairs of the beams 41a, 41b. A pair of mounting holes 46 are located adjacent the midpoint of each of the cross-ties 45 which connect pairs of upper beams 41b.

One end of the bottom beam 41a of each truss 40 is extended beyond the hinged connection and carries an upwardly facing clamping plate 47 which is adapted to receive the bottom end of a float 37. One end of a horizontal bar 48 is fixed to the top of the hinge pin 44, and the other end of the bar 48 is fixed to a downwardly facing clamping plate 49 which is adapted to receive the upper end of a float 37. The entire frame 39 is preferably made of steel, and the separate parts of each truss 40 are joined together by welding.

In the preferred embodiment, 55 gallon drums are used as the floats 37. These drums are water-tight and are preferably filled with material, such as polyurethane foam, to provide added reliability over long periods of use. Each float 37 is positioned between a pair of clamping plates 47, 49 which are suitably interconnected by long threaded rods 51 and nuts which rigidly hold the float therebetween.

Figure 2:
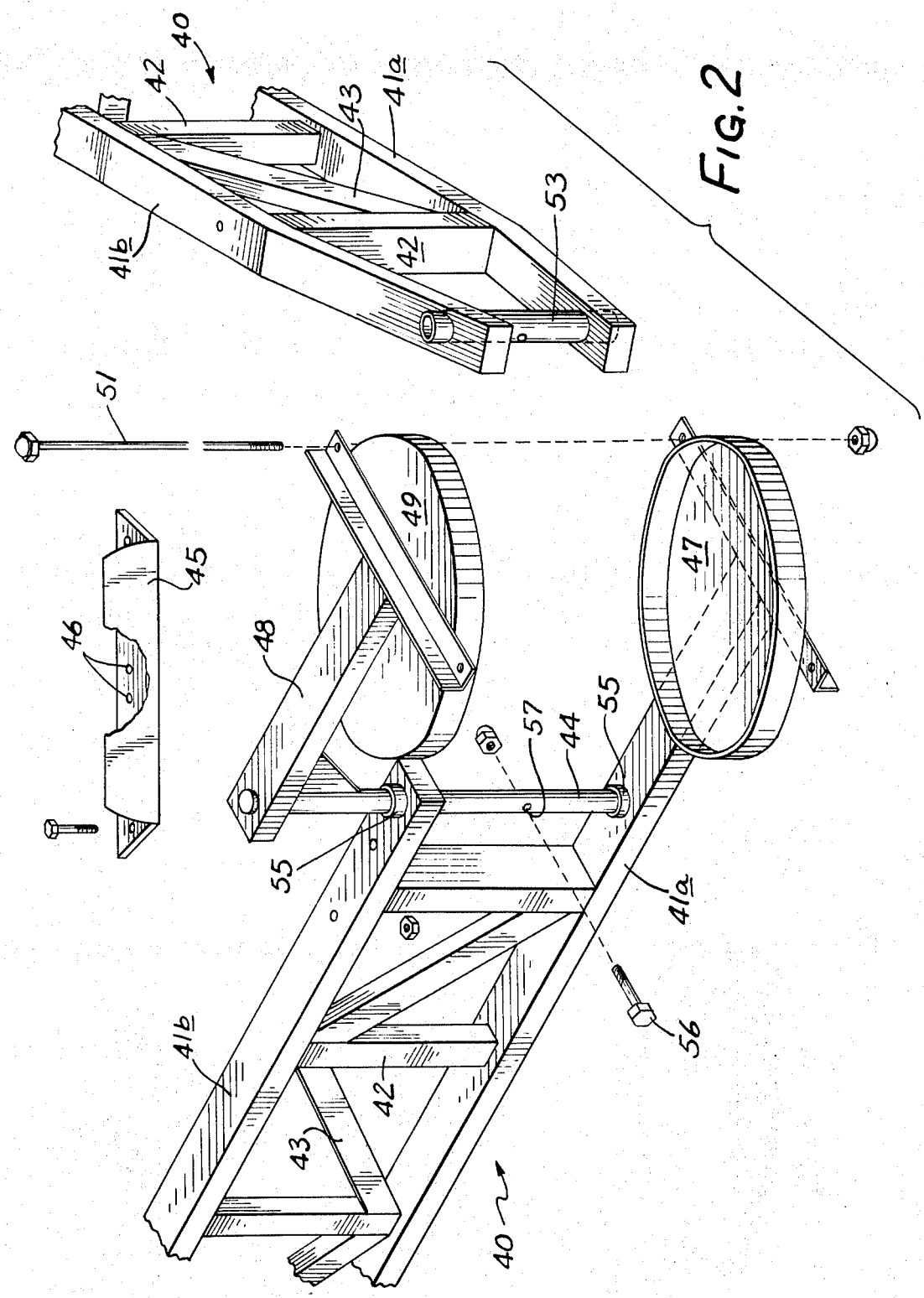
FIG. 2 is an exploded, enlarged perspective view of one portion of the stabilization system shown in FIG. 1.

Referring to FIG. 2, a corner of frame may be assembled by placing the end of the right hand truss 40 between the beams 41a and 41b of the left hand truss 40. The right hand truss 40 is positioned so as to place a sleeve 53 located adjacent the end of the truss 40 in coaxial alignment with a pair of hubs 55 located in the beams 41a and b of the left hand truss 40. The pin 44 is then inserted through the hubs 55 and the sleeve 53 to tie the two trusses together. The cross-tie 45 is then bolted to the trusses 40 to fix the two trusses in a given angular relationship to each other. The upper clamping plate 49 may then be raised slightly to allow the float 37 to be positioned between the two clamping plates 47 and 49. The clamping plate 49 is then lowered to capture the top of the float, and a pair of the long threaded rods 51 are installed to clamp the plates 47 and 49 together. Additionally, a cotter pin or bolt 56 may be inserted in an appropriate channel 57 formed by mating openings in the sleeve 53 and pin 44 to affix the pin 44 to the sleeve 53.

The frame 29 and the floats 37 define what is referred to as a floating platform 61. An anchor line 58 extends from one corner of the frame 39 adjacent a float 37 to an anchor 59, which rests on the bottom of the body of water. Although one anchor may suffice for a particular installation, at least two and preferably all three corners of the floating platform 61 are provided with anchors.

The floating platform 61 possesses a buoyancy beyond that required to float the platform itself. In the preferred embodiment, each float 37 will displace at least 100 additional pounds, and preferably an additional 200 pounds of water, before becoming submerged. This excess buoyancy, the effectiveness of which is multiplied by the effective moment arm of the floating platform, is utilized to stabilize the floating aerator 10.

In the preferred embodiment, three mooring lines 41 and three guy lines 43 are utilized to connect the floating aerator 10 to the floating platform 61. The mooring lines 41 are preferably wire rope, and one end of each mooring line is passed through a cross-tie mounting hole and then suitably secured to itself, as with three wire rope clamps. The other end of each mooring line 41 is suitably secured to a shackle by three wire rope clamps, and the shackle is attached to the frame arms 33, utilizing the mooring line mounting holes 35. The tension in each mooring line 41 is adjusted to cause each mooring line to define a slight catenary between its two ends, which are preferably about the same vertical height above the water.

A guy line 43 is in general vertical alignment with each of the mooring lines 41, which guy lines 43 are preferably lengths of wire rope. The inner end of each guy line 43 is attached to a turnbuckle 63 which is attached to a clevis that is connected through the particular mounting plate hole that is in vertical alignment with the associated mooring line 41. The outer end of the guy line 43 is threaded through another mounting hole 46 in the cross-tie 45 and is suitably secured to itself by three wire rope clamps. The tension in the guy line 43 is set by the turnbuckle to cause the guy line to be substantially taut.

Turnbuckles may also be utilized in the mooring lines 41 either at the end adjacent the aerator 10 or at the end adjacent the cross-tie 45 to provide for ready adjustment of the tension in the lines.

Each guy line 43, the associated mooring line 41 and the aerator 10 define what may be viewed as a triangle in the vertical plane. The vertical height of the aerator 10 defines the altitude of the triangle. The mooring lines 41 and the frame arm 33 define its base, and the guy lines 43 define the third side or hypotenuse. In one embodiment, ⅜-inch wire rope is used for the mooring lines 41, and ¼-inch wire rope is used for the guy lines 43.

All of the guy lines 43 are preferably of equal length, as are the mooring lines 41. Thus, these lines position the aerator 10 in the center of the triangular floating platform 61. In one embodiment, for an aerator having a 25 horsepower motor and an impeller about 7 feet in diameter a platform 61 is used wherein each of the three legs on trusses 40 is about 40 feet long. In this arrangement, the central vertical axis of the aerator 10 is about 25 feet from each of the floats 37 of the floating platform 61, and the mooring lines from their points of attachment to ends of the arms 33 and to the cross-ties 45 measure about 16 feet in length.

The mooring lines 41 are initially less taut than the guy lines 43; however, approximately equal stresses are created in the respective lines when the aerator 10 is in operation. During operation, the aerator 10 exerts an angular rotational force which tends to turn it in the water in the direction opposite to that in which the impeller is being driven. This angular force is resisted by the guy 43 and mooring 41 lines. Because the guy lines 43 are attached to the aerator 10 at a location nearer the axis of rotation of the aerator than are the mooring lines 41, the guy lines 43 will be displaced a smaller angular distance than will the mooring lines. Thus, the mooring lines 41 are initially provided with more slack than are the guy lines 43 so that approximately equal stresses will be present in the respective wire ropes when the aerator is in operation.

Waves, wind and other forces acting upon the floating aerator 10 which would tend to produce erratic movements are transmitted to the stable, triangular floating platform 61. The floats 37 will rise or fall in the water according to the forces acting upon them. As a result of its excess buoyancy the platform 61 resists such irregular motion which the wind and waves would cause. The resistance provided by each float 37 acts to right the floating aerator and is effectively increased by the moment arm of the distance the platform is spaced from the aerator. The length of the moment arm will vary according to the orientation of the platform with respect to the direction of the force being opposed but should be about 15 to 25 feet. To enhance this effect, it is preferred that the arms 33 extend to a location above the flotation collar 17. Additionally the geometry of the floating platform 61 is a factor in determining the stability, and polygonal shaped platforms are preferred. The most preferred shape for the floating platform 61 is triangular because triangular placement of the floats 37 about the aerator 10 precludes more than one float being positioned so as to be ineffective in opposing a given force.

In the embodiment illustrated in FIG. 1, the excess buoyancy of the floats 37 is such that each float provides 100 pounds of excess buoyancy, which is ample for normal operating conditions, and is provided with 100 additional pounds of buoyancy, as a safety factor to compensate for icing conditions on the aerator or the like. Thus, although under normal operating conditions 100 pounds of excess buoyancy per float 37 would be sufficient, 200 pounds of excess buoyancy per float is preferred.

The floating platform 61 provides a wide base for the floating aerator 10 and possesses an inertia which substantially lessens the effect of any force acting upon the floating aerator. The stabilizing forces developed by the floating platform 61 are relatively great as the effect of each float 37 is multiplied by its effective moment arm, and thus the platform 61 will effectively counteract large forces acting upon the floating aerator 10. Thus, the present invention provides a means of stabilization wherein the exterior forces acting on the floating aerator 10, such as wind, will be transmitted to and to a large extent absorbed by the floating platform 61. As the attachment lines 41 and 43 are fairly short, the floating aerator in some ways reacts as though it were operating in a very small body of water because of the effective stabilization of the aerator which is achieved.

Figure 1A:
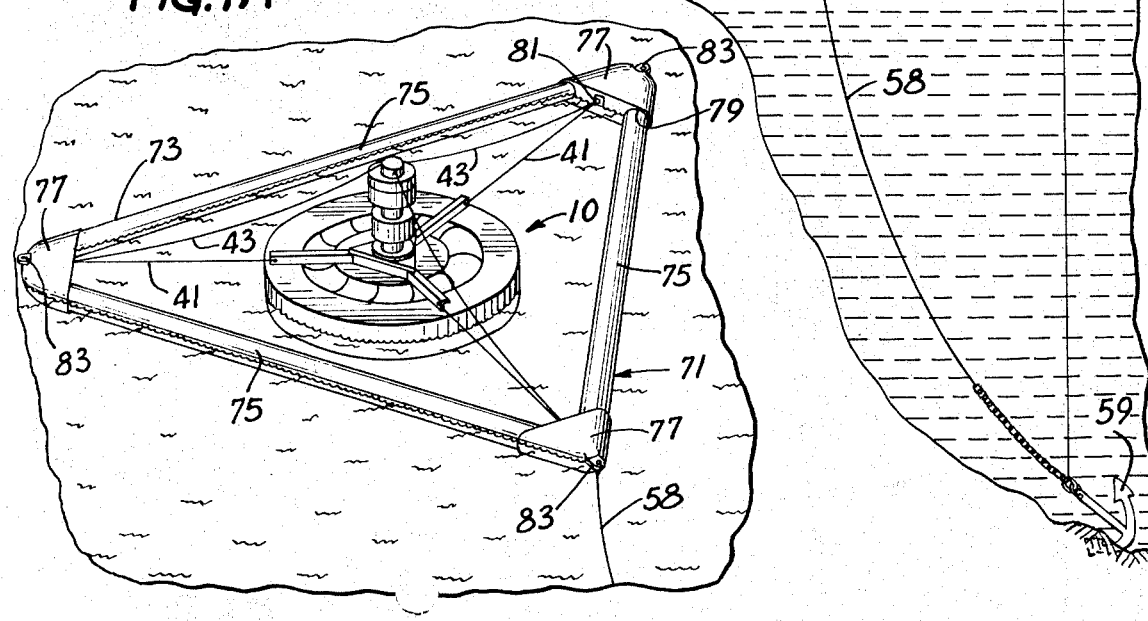
FIG. 1A is a perspective view, similar to FIG. 1, of an alternative embodiment of an aerator flotation system having various features of the invention.

The floating aerator 10 shown in FIG. 1A to illustrate an alternative embodiment of a stabilization system 71 is precisely the same as that previously described hereinbefore in detail, and accordingly like reference numerals are employed to depict those components already described. The stabilization system 71 comprises an open rigid polygonal frame or platform 73 plus the mooring lines 41 and guy lines 43. The platform 73 is triangular in shape, having three straight rigid legs 75. The legs 75 are of substantial diameter and are individually buoyant, being tubes which are preferably filled with polyurethane foam or the like. The tubes are long straight sections, for example 40 or more feet in length, of plastic pipe or of a corrosion-resistant metal, such as aluminum.

Three connectors 77 are provided, one at each apex of the triangle. The connectors 77 are made of any suitable corrosion-resistant material, for example metal or plastic, and they also contribute somewhat to the buoyancy of the platform and are also preferably filled with suitable foam plastic. Each of the connectors 77 is provided with a pair of cylindrical receptacles 79 portioned to accept the ends of the pair of legs 75 that meet at that apex. The inward facing portion of the connectors 77, at a location between the receptacles 79, is provided with a suitable mounting bracket 81 to permit the connection thereto of the mooring line 41 and the guy line 43. Each connector 77 is also provided at its outermost point with a lug 83 to which an anchor line 58 may be attached.

As previously indicated, the open platform 73 surrounds the aerator 10 and is preferably polygonal in shape, most preferably having the shape of a triangle. The platform 73 is anchored via the lugs 83 provided at the corners. Preferably, at least two anchoring lines 58 are employed, and most preferably the platform is anchored by lines 58 leading to all three apexes of the triangle. As in the case of the platform 61 shown in FIG. 1, it is similarly desired that the platform 73 provide about at least about 300 pounds of excess buoyancy, and preferably about 600 pounds, so as to provide the desired stabilization even during adverse conditions which might be encountered during the winter months.

For the reasons previously explained, when a triangular platform 73 is employed, each of the legs 75 are preferably between about 30 and about 50 feet in length. Likewise, the mooring lines 41 are mounted to the aerator 10 at locations above the flotation collar 17, and all portions of the platform 73 are preferably spaced about 5 to 35 feet from the aerator 10.

While a particular embodiment of the invention has been shown and described it should be apparent that various modifications may be made therein without departing from the scope of the invention. Various of the features of the invention are set forth in the claims which follow.

What is claimed is:

1. A water aeration system comprising a floating mechanical surface aerator and means to stabilize said aerator, said floating aerator including a rotor having blades for movement in the water to be aerated, a motor for driving said rotor and flotation means disposed generally outward of said rotor, said flotation means supporting said motor above the water line and supporting said impeller in a predetermined relationship to the water, and said stabilization means including an open rigid platform which is disposed in surrounding relationship to said floating aerator and which provides excess buoyancy, a plurality of mooring lines each having one end attached to said aerator at a location generally adjacent said flotation means and the other end attached to said open rigid platform, and a plurality of guy lines each having one end connected to an upper location upon said floating aerator and the other end attached to said open rigid platform.

2. The aeration system of claim 1 further including anchoring means extending generally downward from said rigid platform and resting upon the bottom of the body of water in which the aeration system is located.

3. The aeration system of claim 1 wherein said platform is polygonal in shape, including a plurality of interconnected straight leg portions.

4. The aeration system of claim 3 wherein said mooring lines and said guy lines are connected to said platform at about the points of intersection between said straight leg portions.

5. The aeration system of claim 4 wherein said platform is generally triangular and wherein said leg portions are of substantially equal lengths.

6. The aeration system of claim 3 wherein said leg portions are each about 30 feet to about 50 feet in length.

7. The aeration system of claim 4 wherein said platform possesses sufficient buoyancy to displace at least an additional 300 pounds of water when fully submerged in excess of that displaced to float said platform.

8. The aeration system of claim 3 wherein said mooring lines spaced equal angular distances apart and each guy line is in vertical alignment with one of said mooring lines.

9. The aeration system of claim 5 wherein said platform is spaced apart from said aerator a distance of between about 5 feet and about 35 feet.

* * * * *